Sept. 14, 1965  E. R. SORENSEN  3,205,856
APPARATUS FOR MANUFACTURING CARBON PAPER
Filed March 4, 1963  3 Sheets-Sheet 1
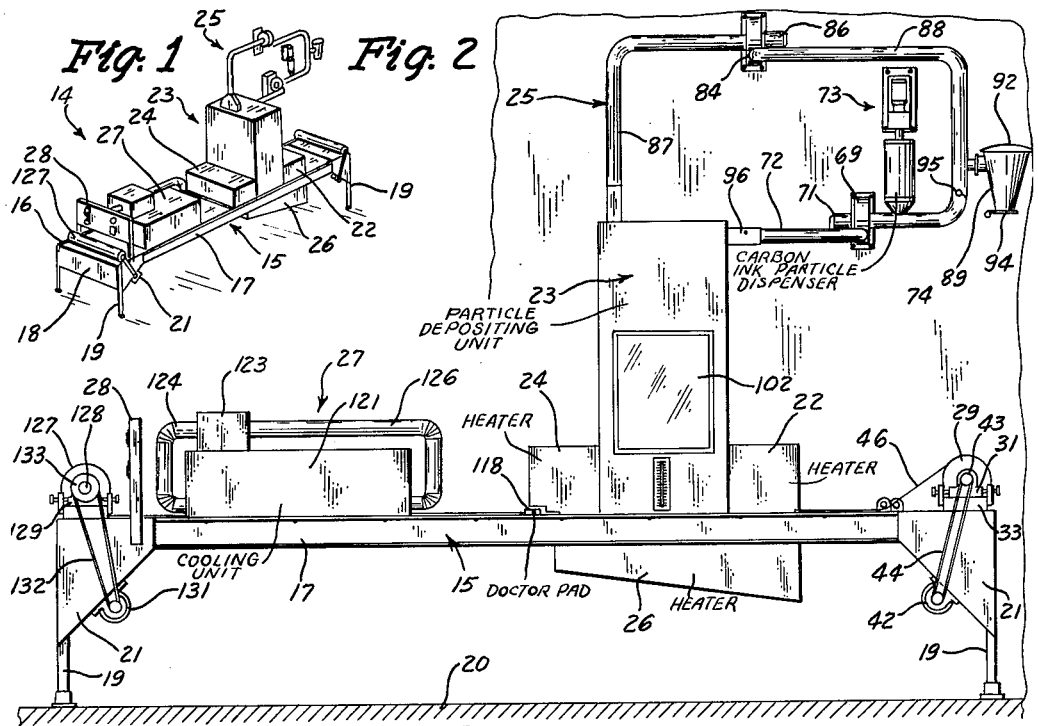
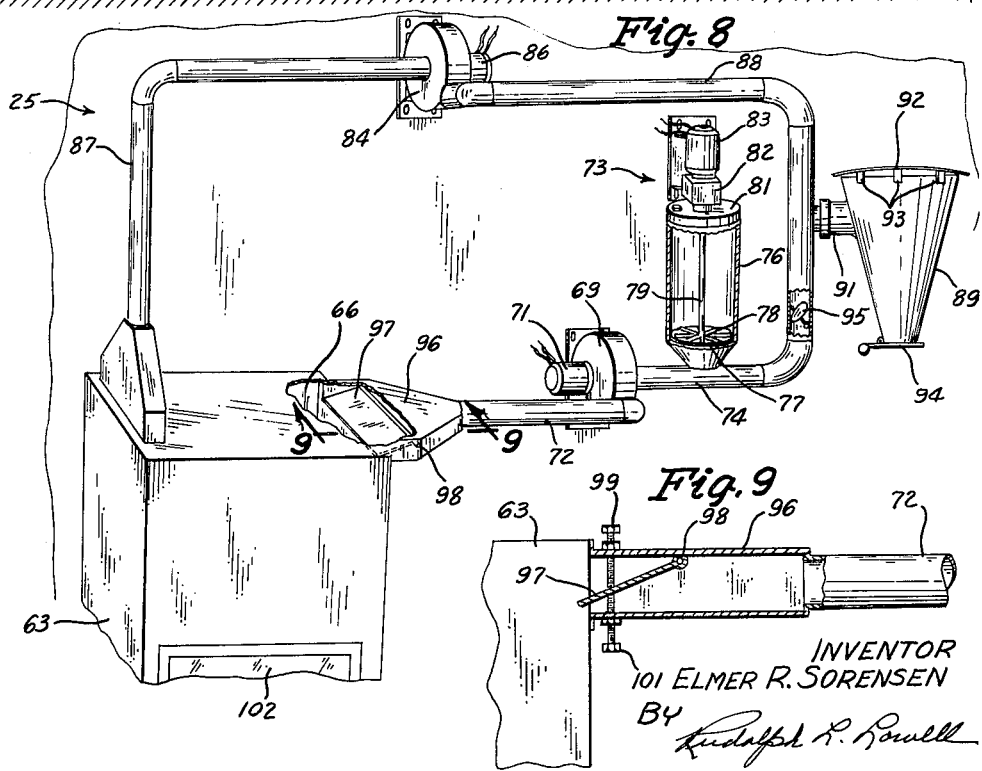
INVENTOR
ELMER R. SORENSEN
BY
ATTORNEY Sept. 14, 1965     E. R. SORENSEN     3,205,856
APPARATUS FOR MANUFACTURING CARBON PAPER
Filed March 4, 1963     3 Sheets-Sheet 2
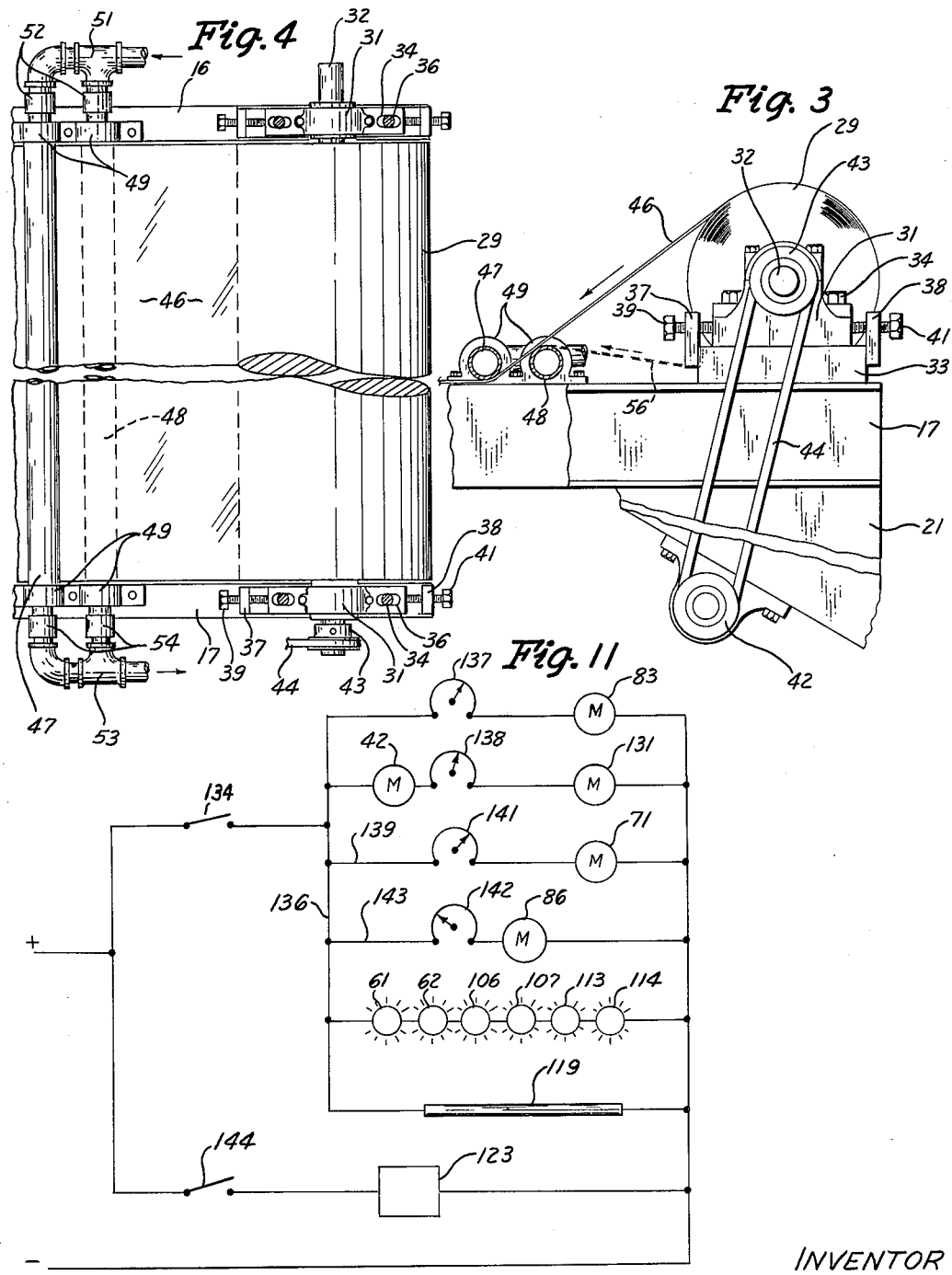
INVENTOR
ELMER R. SORENSEN
BY
ATTORNEY Sept. 14, 1965   E. R. SORENSEN   3,205,856
APPARATUS FOR MANUFACTURING CARBON PAPER
Filed March 4, 1963   3 Sheets-Sheet 3
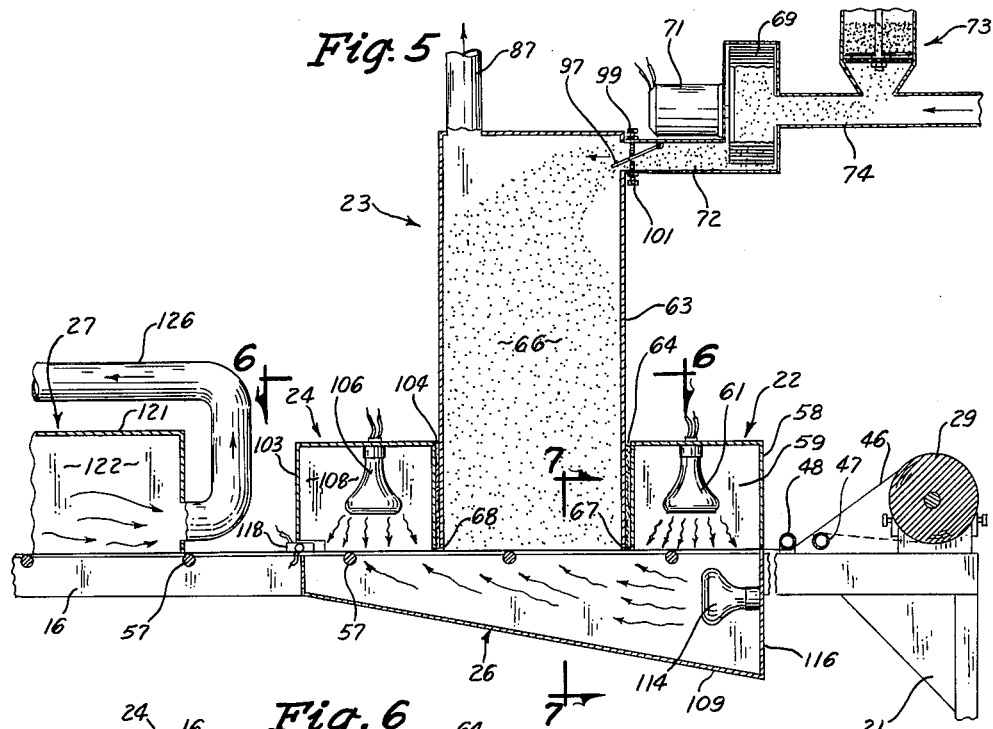
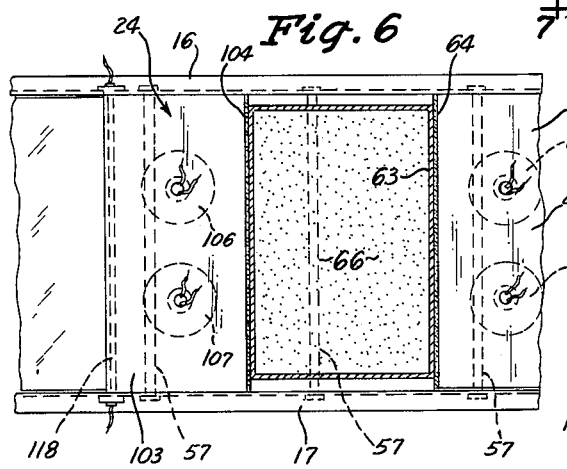
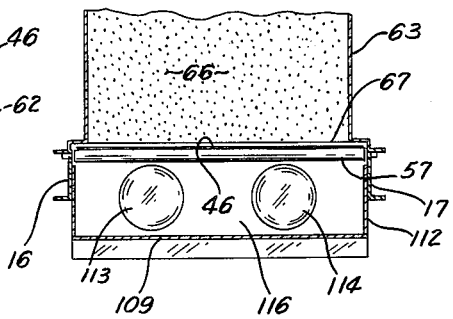
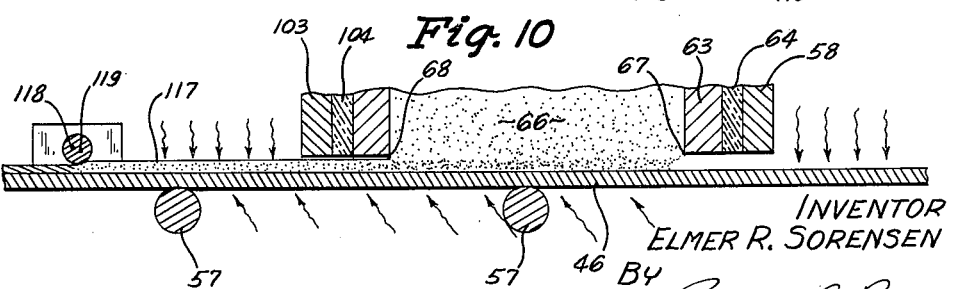
INVENTOR
ELMER R. SORENSEN
BY
Rudolph L. Lowell
ATTORNEY United States Patent Office 3,205,856
Patented Sept. 14, 1965

3,205,856
APPARATUS FOR MANUFACTURING
CARBON PAPER
Elmer R. Sorensen, 541 3rd, West Des Moines, Iowa
Filed Mar. 4, 1963, Ser. No. 262,802
5 Claims. (Cl. 118—67)

This invention relates to an apparatus and method for applying a layer of carbon material on a sheet of base material and more particularly to an apparatus and method for uniformly coating a moving sheet of paper with carbon ink particles and bonding the layer of ink particles to the sheet of paper.

It is the object of the present invention to provide an improved apparatus for continuously applying a layer of dry carbon ink particles on a sheet of base material.

Another object of the invention is to provide an improved method of continuously coating a sheet of base material with a uniform layer of carbon ink particles and bonding the carbon ink particles to the paper.

A further object of the invention is to provide an apparatus for applying dry carbon ink particles to a sheet of carbonizing paper, wherein the particles are carried by an air stream into a particle applying chamber where the air stream is immobilized to provide for the particles falling, by the action of gravity, upon the sheet which is movable across the bottom of the chamber.

A further object of the invention is to provide a machine which uniformly distributes isolated particles of dry carbon ink on a moving article to be covered with the ink wherein the speed of the moving article is co-ordinated with the flow and density of the ink particles to control the thickness of the layer of ink on the moving article.

Still another object of the invention is to provide a machine which supplies an uninterrupted flow of aerated particles, uniformly deposits the particles on a continuously moving sheet of material, and bonds the particles to the sheet of material.

An additional object of the invention is to provide an automatic, and fast operating apparatus for applying and bonding carbon ink particles to base material which is rugged and economical in construction, relatively maintenance free, yet reliable and efficient in use.

The exact nature of the invention as well as other objects and advantages thereof will be readily apparent from the consideration of the following specification relating to the annexed drawing in which:

FIG. 1 is a perspective view of the apparatus for manufacturing carbon paper of the invention showing the over-all appearance of the machine;

FIG. 2 is an enlarged side elevational view of the apparatus of FIG. 1;

FIG. 3 is an enlarged side elevation view of the base material supply roll and mount therefor of the apparatus of FIG. 1;

FIG. 4 is a plan view of the base material supply roll and mount shown in FIG. 3;

FIG. 5 is a fragmentary sectional side elevational view of the apparatus showing the particle coating chamber;

FIG. 6 is a sectional view taken along the line 6—6 of FIG. 5;

FIG. 7 is a sectional view taken along the line 7—7 of FIG. 5;

FIG. 8 is an enlarged perspective view of the carbon ink particle applying mechanism of the apparatus of FIG. 1;

FIG. 9 is an enlarged sectional view taken along the line 9—9 of FIG. 8;

FIG. 10 is an enlarged fragmentary sectional view of the apparatus showing the relationship between the bottom particle coating chamber and the moving base material; and FIG. 11 is a circuit diagram of the electric system of the apparatus of FIG. 1.

Referring to the drawing, there is shown in FIG. 1 the machine of the invention indicated generally by the number 14 which functions to continuously produce a laminated article comprising base sheet material and a layer of carbon ink material. This laminated article is commonly known as carbon paper. The machine comprises a frame 15 which supports the base sheet material for movement in an elongated horizontal path. The carbon ink material is initially deposited in a uniform blanket upon the top surface of the base sheet material in the form of carbon ink particles by a particle depositing unit 23 which is mounted on the frame 15 and extends over the base sheet material. The depositing unit 23 is continuously provided with carbon ink particles or dust by an air and ink supply system 25 which operates to introduce ink particle laden air into the depositing unit 23 and exhaust air from the depositing unit 23 to balance the flow of air through the depositing unit 23 so that the particles therein settle, under the influence of gravity, in a substantially uniform blanket upon the top surface of the base sheet material under the depositing unit 23.

A plurality of heating units 22, 24, and 26 are secured to the frame adjacent the depositing unit 23 and extend over and under the elongated path of the base material. The first heating unit 22 extends transversely of the machine and is positioned adjacent the rear wall of the depositing unit 23 above the base material and functions to preheat the base material prior to its movement into the depositing unit 23. The second heating unit 24 extends transversely of the machine and is positioned adjacent the forward wall of the particle depositing unit 23. Positioned below the first heating unit 22 and longitudinally extended under the second heating unit 24 is a third heating unit 26. The third heating unit 26 extends transversely of the machine and is secured to the frame 16.

A cooling unit 27 extends transversely of the machine over the elongated path and is secured to the frame forward of the second heating unit 24. The entire operation of the machine is regulated from a control panel 28 which is forward of the cooling unit 27 and extends in an upward direction with the lower end thereof secured to the frame 15.

The machine is spaced above a supporting surface 20 by the frame 15 which comprises a pair of longitudinally extended channel beams 16 and 17 which are held in a laterally spaced relationship by means of transverse members 18. The channel beams 16 and 17 are parallel with the space between the beams defining an elongated path. Downwardly projected legs 19 secured to the end of each channel beam 16 and 17 by means of a gusset plate 21 position the beams vertically above the support surface 20.

As shown in FIG. 2, a supply roll of base material 29 such as paper, plastic or fabric is rotatably mounted on the top flange of the rear end of the machine 14 by means of bearing blocks 31 at each end of the roll. As best illustrated in FIGS. 3 and 4, the central shaft 32 of the roll 29 is journaled in the bearing blocks 31 which are secured to the top flange of the channel beams 16 and 17 by means of support blocks 33. Bolts 34 extend downward through oblong holes 36 in the bearing block 31 to hold the bearing block 31 on the support block 33. When the bolts 34 are turned back the bearing blocks 31 may be moved longitudinally on the channel beams 16 and 17 to adjust the position of the base material supply roll 29. In order to hold the bearing blocks 31 in the adjusted position the support block 33 is provided with upwardly projected legs 37 and 38 which threadably support adjusting bolts 39 and 41. The forward end of each bolt is in engagement with the opposite ends of the bearing blocks 31 thereby holding the bearing blocks 31 in a fixed position relative to the channel beams 16 and 17.

The tension of the material from the supply roll 29 is controlled by an electrodynamic brake 42. A pulley 43 fastened to the outer end of the shaft 32 of the supply roll 29 and a belt 44 positioned on the pulley 43 connect the brake 42 with the supply roll 29.

From the supply roll 29 the base material 46, in sheet form, passes between a pair of longitudinally spaced tubular rollers 47 and 48. Bearing blocks 49 positioned at the ends of each of the rollers rotatably mount the rollers on the top flange of the channel beams 16 and 17. A source of heated fluid, such as steam, is connected to the ends of the tubular rollers 47 and 48 by means of a fluid conductor 51 and slip couplings 52. The hot fluid flows through the tubular rollers 47 and 48 to preheat the top and bottom surfaces of the base material 46 as it unwinds from the supply roll 29. A fluid conductor 53 connected to the opposite ends of the tubular rollers 47 and 48 by means of slip couplings 54 directs the hot fluid back to the fluid source. As shown by the broken line 56 in FIG. 3, the base material may be unwound from the bottom of a reverse wound supply roll thereby eliminating the necessity of mounting the base material supply roll in an end-to-end position on the bearing blocks 31.

As shown in FIGS. 5 and 6, the base material 46 moves in an elongated path longitudinally between the channel beams 16 and 17 on a plurality of longitudinally spaced transverse rollers 57. The ends of each roller are rotatably mounted on the base of the respective beams adjacent the top flange. The rollers 57 support the base material 46 as it moves along the elongated path longitudinally of the beams 16 and 17.

The first heating unit 22 comprises a housing 58 which forms a heating chamber 59. The housing 58 is mounted on the top flanges of the channel beams 16 and 17 and extends over the space between the beams. The temperature of the air in the chamber 59 is controlled by a pair of heat lamps 61 and 62 which are fastened to the top wall of the housing 58 to direct heat energy in a downward direction.

The particle depositing unit 23 comprises a rectangular-shaped housing 63 which extends in an upward direction. The housing 63 is mounted on the top flanges of the channel beams 16 and 17 and is separated from the forward walls of the housing 58 by means of thermal insulating material 64. As shown in FIGS. 6 and 7 the housing 63 forms a chimney-type chamber 66 and terminates slightly inward from the inner edges of the channel beams 16 and 17. The lower edges 67 and 68 of the forward and rear wall respectively, of the housing 63 extend transversely over and slightly above the upper surface of the base material 46 supported on the rollers 57.

Referring to FIG. 8, there is shown the particle and air supply system 24 which comprises a blower 69 operated by an electric motor 71 for blowing particle laden air through a pipe 72 into the upper end of the housing 63. The particles are a dry ink mixture which includes carbon, wax and oils. The ink particles are commercially sold by the Ennis Business Forms Company, Ennis, Texas, as Black Ink Hard No. 13210–3–A and Black Ink Extra Soft No. 13478–2–A. These commercially available ink particles are of a soft waxy consistency and by volume include about twenty percent paraffin, twenty percent carnauba wax, fifteen percent petrolatum, ten percent ink oil, fifteen percent china clay and about twenty percent carbon black, when black carbon paper is to be made. In the making of a blue carbon paper a methyl violet blue base coloring and milori blue is substituted for the carbon black.

The ink particles are supplied to the blower 69 by means of a feeder 73 which is connected to the intake of the blower 69 by means of a pipe 74. The ink particles may be placed into the exhaust air from the blower 69 by connecting the feeder 73 to the pipe 72. The feeder 73 comprises a container 76 adapted to store a quantity of ink powder. The bottom of the container 76 is conical in shape and is connected to the pipe 74 to permit the particles in the container to flow into and mix with the moving air in the pipe 74. A screen 77 of between .040 to .010 inch mesh is positioned across the bottom of the container 76 and supports the ink particles therein. The carbon ink in the container 76 is worked through the screen 77 by a sifting blade 78 positioned adjacent the upper surface of the screen 77. The blade 78 is connected to a longitudinally extended shaft 79 which extends through the cover plate 81 and is connected to a gear reduction unit 82 driven by an electric motor 83. In operation the speed of the motor 83 may be varied to control the rotational movement of the sifting blade 78 thereby regulating the quantity of ink particles fed into the moving air in the pipe 74.

A second blower 84 operated by an electric motor 86 is connected by means of a pipe 87 to the top of the housing 63 and functions to withdraw air from the chamber 66 and direct the withdrawn air through a pipe 88 back to the intake pipe 74 for the blower 69. A cone-shaped particle collector 89 is connected to the pipe 88 by a pipe coupling 91 and receives the excess air discharged by the blower 84. The collector 89 has a hinged bottom door 94 which permits the collected particles to be removed from the collector and replaced back into the ink feeder container 76. The top of the collector 89 is enclosed with a curved lid 92 which has downwardly extending straps 93 which are circumferentially spaced in a circle and frictionally grip the inner section of the top wall of the collector 89 to hold the lid 92 slightly above the top edge of the collector 89.

The flow of air from the pipe 88 and collector 89 to the blower 69 is controlled by a pipe damper 95 which is rotatably mounted in the pipe 88 downstream from the collector 89. As shown in FIG. 9, the exhaust pipe 72 for the blower 69 is connected to the top of the housing 63 by a flat pipe coupling or foot 96. A flat damper blade 97 is positioned within the pipe coupling 96 to control the direction of the flow of air forced into the chamber 66. A horizontally extending rod 98 extends through the sides of the pipe coupling 96 and is connected to the flat damper blade to mount the blade for pivotal movement about a horizontal axis. The angular position of the damper blade 97 is controlled by a pair of set screws 99 and 101 which are threaded through the top and bottom wall respectively of the pipe coupling 96 and engage the damper blade 97 forward of the pivot rod 98.

The blower 69 operates to draw particle laden air from the inlet pipe 74 and to aerate the ink by uniformly mixing the particles with the carrier air and to discharge the homogeneous mixture of ink particles and air through the discharge pipe 72 and coupling 96 into the top of the chamber 66 formed by the housing 63. The discharge blower 84 withdraws a volume of air from the chamber 66 which is substantially equal to the quantity of air introduced into the chamber by the blower 69. The air withdrawn from the chamber 66 contains a smaller percentage of ink particles, as the ink particles introduced into the chamber are released or separated from the moving air by the force of gravity. The released particles steadily fall to the bottom of the chamber 66 in relatively still air to form a blanket of ink particles on the top surface of the base material 46 moving under the housing 63. During the operation of the depositing unit 23 the air in the lower section of the chamber 66 is in a quiescent state so that the carbon ink particles carried into the chamber by the action of the blower 69 filter or float toward the bottom of the chamber in a relatively uniform pattern. The density and uniformity of the ink particles in the chamber 66 is visually observed through an inspection window 102 forming part of the housing 63.

As shown in FIGS. 5 and 6, the second heating unit 24 comprises a housing 103 mounted on the top flanges of the channel beams 16 and 17 forward of the depositing unit 23. A layer of thermal insulating material 104 separates the housing 103 from the forward wall of the housing 63 of the depositing unit 23 to minimize the conduction of heat to the housing 63. A pair of heat lamps 106 and 107 are mounted on the top wall of the housing 103 and function to increase the temperature of the chamber 108 defined by the housing 103. The heat lamps 106 and 107 increase the temperature of the blanket of ink particles deposited on the base sheet paper 46 to a temperature just below the melting point of the ink.

The third heating unit 26 comprises an elongated housing 109 positioned between the channel members 16 and 17. As shown in FIG. 7, the housing 109 extends below the channel beams 16 and 17 and has upwardly projected side walls 111 and 112 which are secured to the channel beams 16 and 17 respectively. A pair of heat lamps 113 and 114 are supported on the rear end wall 116 of the housing 109. The longitudinal extent of the housing 109 is such that the lamps 113 and 114 heat the bottom surface of the base sheet material 46 as it moves through the first heating unit 22, the depositing unit 23, and the second heating unit 24. The application of heat to the bottom surface of the base material 46 tends to equalize the temperature differential between the top and bottom surfaces of the material thereby reducing the tendency of the sheet material to curl and ripple.

As shown in FIGS. 5, 6, and 10, the blanket of heated carbon ink particles on the base material 46 is spread out and pressed toward the top surface of the material 46 by a doctor rod 118 which is mounted on the top flanges of the channel beams 16 and 17 and is in engagement with the blanket of ink particles 117 adjacent the forward edge of the housing 103 of the second heating unit 24. An electrical resistance element 119 contained within the rod 118 functions to heat the rod 118 above the melting point of the ink. As shown in FIG. 10, as the blanket of ink particles 117, which is heated slightly below its melting point by the heating units 24 and 26, passes under the doctor rod 118 the ink is transformed into a semi-solid material which is spread out over the entire top surface of the base sheet material 46.

The cooling unit 27, shown in FIGS. 2 and 5, is positioned forward of the second heating unit 24 and comprises a housing 121 secured to the top flange of the channel beams 16 and 17 and extending over the space between the beams to define a cooling chamber 122 which has a bottom wall formed by the base sheet material 46 and the carbon ink material bonded thereto. The chamber 122 is supplied with cooling air by means of an air conditioning unit 123 mounted on the top of the housing 122. The cool air from the air conditioning unit 123 is directed into the chamber 122 by a pipe 124. The exhaust air from the chamber 122 is directed back to the air conditioning unit 123 by a pipe 126. The air conditioning unit 123 supplies cool air to the forward end of the chamber 122 and exhausts air from the rear of the chamber 122 thereby providing a continuous cooling of the laminated material as it moves longitudinally through the cooling chamber 122.

The base material 46 is pulled along the elongated path over the rollers 47 by a power driven receiving roll 127. The drive shaft 128 for the roll 127 is rotatably mounted in bearing blocks 129 which are similar to the bearing blocks 31. An electric motor 131 mounted on the gusset plate 21 below the roll 127 is drivably connected to the drive shaft 128 by means of a belt 132 and a pulley 133 which is secured to the end of the drive shaft 128. When energized, the motor 131 operates to rotate the paper receiving roll 127 to pull the paper off of the base material supply roll 29 against the retarding force of the electrodynamic brake 42. The base material moves along the elongated path over the transverse rollers 57 journaled on the channel beams 16 and 17.

Referring to FIG. 11, there is shown the electrical system for the operation and control of the heating units, the dust depositing unit and the cooling unit of the machine. A first control switch 134 connects the source of electrical power to a common line 136 which functions as a feed conductor. The electric motor 83 for the ink feeder 73 is controlled by a rheostat 137 electrically coupled to the feeder line 136. The electrodynamic brake 42 is connected in series with the drive motor 131 with a control rheostat 138 interposed in the line between the brake and drive motors 42 and 131 respectively. The rheostat 138 controls the brake in proportion to the power developed by the motor 131 to keep the tension on the base sheet material 46 relatively constant.

A conductor 139 connected to the feed line 138 connects a rheostat 141 with the motor 71 of the blower 69. The rheostat 141 is adjustable to vary the speed of the motor 71. The motor 86 for the blower 84 is independently controlled by a rheostat 142 in the motor supply line 143 which is connected to the feed line 136.

The heat lamps 61, 62, 106, 107, 113, 114 are connected in series with the feed line 136. Connected in parallel with the heat lamps into the feed line 136 are the electrical resistant heater elements 119 of the doctor rod 119.

When the switch 134 is closed the respective heating lamps and heater elements are simultaneously energized with the ink feeder motor 83, the receiving roll motor 131 and the blower motors 71 and 86. A separate control switch 144 connects the source of electrical power to the air conditioning unit 123 to energize the same independent of the other units of the machine.

As shown in FIG. 1, the control panel 28 provides a central location for the manual control switches 134 and 144 and the motor control rheostats 137, 138, 141, and 142.

In the operation of the machine, with the base material supply roll 29 mounted on the bearing blocks 31 the base material 46 is unrolled and passed between longitudinally spaced tubular rollers 47 and 48 and threaded under the first heating unit, the depositing unit, and the second heating unit 24. As shown in FIG. 10, the base material 46 engages the top of the transverse rollers 57 and extends under the doctor rod 118. The base material 46 is pulled through the cooling unit 27 and attached to the drive shaft 128 of the laminate receiving roll 127.

When the operator of the machine closes the switches 134 and 144 the motor 131 is energized to rotate the laminate receiving roll 127 thereby moving the sheet of base material 46 along the elongated path longitudinally of the channel beams 16 and 17. The tubular rollers 47 and 48 which are in engagement with the top and bottom surfaces of the paper heat the paper and direct the paper in the plane of the elongated path. From the tubular rollers 47 and 48 the paper 46 moves under the first heating unit 22 and above the third heating unit 26. The heat lamps 61 and 62 and 113 and 114 in the respective chambers heat the top and bottom surfaces of the moving base material 46.

The carbon ink particles are dispensed into the intake air stream in the pipe 74 for the blower 69 by the rotation of the sifting blade 78 over the screen 77 in the ink feeder 73. The speed of rotation of the shifting blade 78 is controlled by the speed of the motor 83 which is determined by the setting of the rheostat 137. The blower 69 operated by the motor 71 aerates the carbon ink particles and moves the mixture of air and particles through the pipe 72 into the top of the chimney-type particle depositing chamber 66. The damper 97 in the connecting boot 96 is adjustable to deflect the mixture of incoming air and particles downward into the chamber 66.

The blower 84 operated by the motor 86 withdraws air from the chamber 66 in an amount which is substantially equal to the air forced into the chamber by the blower 69. This equivalent exchange of air does not have a turbulent effect on the air in the lower sections of the chamber. The volumetric capacity of the blower 84 is determined by the speed of the motor 86 which is controlled by the rheostat 142. The operator of the machine by visually noting the state of the air in the chamber 66 through the inspection window 102 can adjust the rheostats 141 and 142 to control the air flow into and out of the chamber 66 in accordance with the movement of the air in the lower portions of the chamber 66. The density of the ink particles in the chamber 66 is controlled by the speed of the ink feeder motor 83. An increase in the speed of the motor 83 effected by the regulation of the rheostat 137 increases the number of particles dispensed per unit of time into the chamber 66.

As shown in FIG. 10, the carbon ink particles in the chamber 66 separate from the air by the force of gravity and settle into a uniform blanket of carbon ink particles upon the base material 46 which is moving under the lower edges 67 and 68 of the housing 63. The carbon ink particles are continuously being deposited upon the upper surface of the base material 46 while the material is being continuously moved along the bottom of the chamber 66. As the blanket of ink particles moves from the chamber 66 the heat lamps 106 and 107 of the second heating unit in combination with the heat in the third heating unit 26 raises the temperature of the carbon ink slightly below its melting point. As the heated blanket of ink particles 117 leaves the second heating unit 24 the hot doctor rod 118 transforms the dust into a semi-solid material and spreads the material over the entire top surface of the base material 46.

After the base material 46 and the semi-solid ink material on the top surface thereof leaves the doctor rod 118 it is carried through the cooling chamber 122 of the cooling unit 27. When the carbon ink material is cooled it is transformed into a solid which adheres to the surface of the base material 46 to form a laminated sheet, commonly known as carbon paper.

As the laminated sheet egresses from the cooling unit 26 it is wound upon the receiving roll 127. The operator of the machine inspecting the finished product as it egresses from the cooling unit can regulate the speed of movement of the base material in the elongated path and coordinate it with the thickness of the particles being deposited on the top surface of the material in the chamber 66 to control the thickness of the carbon ink layer of the laminated sheet.

When the receiving roll 127 is filled or the supply roll 29 is exhausted, the receiving roll 127 is removed from the machine and subsequently cut and sliced into commercial sizes.

While there have been shown, described, and pointed out the fundamental novel features of the invention as applied to the preferred embodiment, it is to be understood that various omissions, substitutions, changes in form, and details in the method and apparatus illustrated may be made by those skilled in the art, without departing from the spirit of the invention. It is intended to be limited only as indicated by the scope of the following claims.

I claim:
1. An apparatus for applying a layer of carbon ink material to the top surface of a sheet material comprising:
(a) a frame having a pair of parallel side beams and roller means mounted on said beams and extended transverse of said beams to form an elongated path.
(b) means for moving said sheet material over said roller means along the elongated path,
(c) housing means defining an upwardly extended dust depositing chamber mounted on said frame and having an open bottom end closed by said top surface,
(d) means for introducing carbon ink particles suspended in air into the top of said dust depositing chamber and for removing air from the top of the chamber at a rate substantially equal to the rate at which air is introduced into the chamber whereby the ink particles are suspended in relatively still air so as to settle in a uniform blanket upon the top surface of the sheet material moving over said roller means in the elongated path,
(e) a first heating chamber having heater means mounted on said frame adjacent said depositing chamber for heating the blanket of carbon ink particles on the top surface of the base sheet material moving out from under the depositing chamber,
(f) a second third heating chamber having heater means mounted on said frame below the first heating chamber for heating the bottom surface of the base sheet material during movement thereof, under said depositing chamber, and through said first heating chamber,
(g) rod means adjacent the terminal edge of said first heating chamber and extended over said base sheet material transverse to the direction of movement thereof and in engagement with said blanket of carbon particles for uniformly spreading said ink over the top surface of said base sheet material during the movement thereof under said rod means, said rod means including heater means for applying heat to said blanket of carbon ink particles, and
(h) means for cooling the base sheet material and layer of carbon ink material carried thereby after the movement thereof from the rod means.

2. An apparatus for applying a layer of carbon material to one surface of sheet material comprising:
(a) a frame defining an elongated path,
(b) means for moving said sheet material over said frame along the elongated path,
(c) housing means defining an upwardly extended particle depositing chamber mounted on said frame, the bottom of said housing means being open immediately above said elongated path so that the sheet material constitutes a closure therefor,
(d) means for introducing carbon particle material suspended in air into the top of said depositing chamber and for removing air from the top of the chamber at a rate substantially equal to the rate at which air is introduced into the chamber whereby the particles introduced therein settle through quiescent air in a uniform blanket upon the top surface of the base sheet material moving over said frame in the elongated path, and
(e) heating means mounted on said frame adjacent said dust depositing chamber for heating the blanket of carbon particle material on the top surface of the base sheet material moving out from under the depositing chamber.

3. In an apparatus for applying a layer of particle material to one surface of sheet material,
(a) housing means defining a particle depositing chamber having an open bottom closely adjacent said one surface of the sheet material so that the sheet material constitutes a closure therefor,
(b) first blower means having an air intake pipe and an air exhaust pipe, said exhaust pipe connected to said housing means adjacent the top and to one side thereof to direct air from the first blower means into said chamber,
(c) particle dispensing means for introducing particle material into the air moved by the first blower means, and
(d) second blower means having an air intake pipe and an air exhaust pipe, said intake pipe connected to said housing means adjacent the top and to a side thereof opposite said one side to withdraw air from said chamber in an amount substantially equal to the air introduced into said chamber by the first blower means, whereby the particle material moved into said chamber by said first blower means is suspended in quiescent air so as to settle in a uniform blanket on the one surface of the sheet material.

4. The invention according to claim 3 including:
(a) pipe means extended between and connected to the air exhaust pipe of said second blower means and to the air intake pipe of said first blower means, and
(b) valve means in said pipe means to regulate the flow of air from the second blower means to the first blower means.

5. In an apparatus for applying a layer of particle material to one surface of sheet material,
(a) housing means defining an upright particle depositing chamber having a closed top and an open bottom closedly adjacent said one surface of the sheet material,
(b) first means for directing air into the top of said chamber adjacent one side thereof,
(c) particle dispensing means connected to said first means for introducing particle material into the air directed into said chamber by the first means, and
(d) second means for withdrawing air from the top of said chamber adjacent a side thereof opposite said one side in an amount substantially equal to the air introduced into said chamber by said first means whereby the particle material directed into the chamber is dispersed across said chamber and suspended in quiescent air so as to settle in a uniform blanket upon said one surface of the sheet material.

References Cited by the Examiner

UNITED STATES PATENTS

| | | | |
|---|---|---|---|
| 658,346 | 9/00 | Commoss | 117—23 XR |
| 1,741,684 | 12/29 | Dobinson | 118—309 |
| 2,170,140 | 8/39 | Grupe | 117—36.4 |
| 2,355,919 | 8/44 | Lipsius | 117—60 XR |
| 2,759,449 | 8/56 | Lindquist | 118—636 |

WILLIAM D. MARTIN, *Primary Examiner.*

MURRAY KATZ, *Examiner.*